(12) United States Patent
Hickman guevara et al.

(10) Patent No.: US 10,501,020 B1
(45) Date of Patent: Dec. 10, 2019

(54) VEHICLE MULTI-FUNCTION STORAGE SOLUTION

(71) Applicant: Ford Global Technologies, LLC, Dearborn, MI (US)

(72) Inventors: Alfonso Hickman guevara, Tlalnepantla (MX); Luis Jesus Chavela guerra, Mexico City (MX); Luis Olmos gonzalez, Tlalnepantla (MX); Cuauhtemoc Quiroz, Mexico City (MX); David Mercado, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/985,784

(22) Filed: May 22, 2018

(51) Int. Cl.
*B60R 7/04* (2006.01)
*B60N 3/10* (2006.01)
*B60R 7/08* (2006.01)
*B60R 11/00* (2006.01)

(52) U.S. Cl.
CPC ............... *B60R 7/04* (2013.01); *B60N 3/102* (2013.01); *B60R 7/087* (2013.01); *B60R 2011/0007* (2013.01); *B60R 2011/0085* (2013.01)

(58) Field of Classification Search
CPC ..... B60R 7/04; B60R 7/00; B60R 2011/0007; B60R 2011/0085; B60R 2011/0084; B60N 2/14; B60N 2/10; B60N 2/2869; B60N 2/074
See application file for complete search history.

(56) References Cited

U.S. PATENT DOCUMENTS

| | | | | |
|---|---|---|---|---|
| 4,568,117 | A | 2/1986 | McElfish et al. | |
| 4,809,897 | A * | 3/1989 | Wright, Jr. | B60N 3/101 220/521 |
| 5,823,599 | A * | 10/1998 | Gray | B60K 37/00 296/37.8 |
| 6,644,526 | B2 * | 11/2003 | Pegorier | B60R 7/04 220/212 |
| 6,869,121 | B2 * | 3/2005 | Kayumi | B60N 2/01 296/37.15 |
| 7,111,883 | B1 | 9/2006 | Patel et al. | |
| 7,445,261 | B2 * | 11/2008 | Joler | B60R 7/04 296/24.34 |
| 8,091,957 | B2 * | 1/2012 | Allmann | B60R 7/043 297/129 |
| 9,561,746 | B2 * | 2/2017 | Parlow | B60N 3/102 |
| 9,789,824 | B1 * | 10/2017 | Juarez Corona | B60Q 1/0082 |
| 2003/0234550 | A1 * | 12/2003 | Brooks | B60R 7/04 296/24.46 |
| 2010/0090491 | A1 * | 4/2010 | Hipshier | B60R 7/04 296/24.34 |

FOREIGN PATENT DOCUMENTS

EP          2033843 A3    10/2010

* cited by examiner

*Primary Examiner* — Derek J Battisti
(74) *Attorney, Agent, or Firm* — Vichit Chea; Price Heneveld LLP (57) ABSTRACT

A storage solution for a vehicle includes a rotatable body that has a plurality of faces. The storage solution for a vehicle also includes a dowel that defines a rotation axis. The dowel is coupled to opposing faces of the rotatable body. One or more storage features are deployable from each face of the rotatable body that is free of engagement with the dowel.

12 Claims, 5 Drawing Sheets

VEHICLE MULTI-FUNCTION STORAGE SOLUTION

FIELD OF THE DISCLOSURE

The present disclosure generally relates to storage solutions. More specifically, the present disclosure relates to multi-function storage solutions.

BACKGROUND OF THE INVENTION

Vehicles are often provided with various storage solutions. However, typical storage solutions are single-purpose and do not offer a variety of features to a user. Accordingly, there is a need for alternative storage solutions that can meet the needs and preferences of the user while utilizing space efficiently.

SUMMARY OF THE INVENTION

According to a first aspect of the present disclosure, a storage solution for a vehicle includes a rotatable body that has a plurality of faces. The storage solution for a vehicle also includes a dowel that defines a rotation axis. The dowel is coupled to opposing faces of the rotatable body. One or more storage features are deployable from each face of the rotatable body that is free of engagement with the dowel.

Embodiments of the first aspect of the present disclosure can include any one or a combination of the following features:
 the rotatable body occupies the same horizontal and vertical coordinates within the vehicle independent of which face is presented to a user;
 the rotatable body is positioned within a housing that is coupled to the vehicle;
 the housing is a floor console of the vehicle;
 the housing includes an actuatable closeout panel;
 the closeout panel pivots about a fixed axis when the rotatable body is rotated about the dowel; and
 a stowed position of the one or more storage features results in the one or more storage features occupying the same coordinates as the dowel in one of a horizontal plane and a vertical plane while the one or more storage features occupy different coordinates from the dowel in the other of the horizontal plane and the vertical plane.

According to a second aspect of the present disclosure, a storage solution for a vehicle includes a rotatable body that is generally cube-shaped and has a plurality of faces. A dowel defines a rotation axis and is coupled to opposing faces of the rotatable body. One or more storage features are deployable from each face of the rotatable body that is free of engagement with the dowel.

Embodiments of the second aspect of the present disclosure can include any one or a combination of the following features:
 the rotatable body occupies the same horizontal and vertical coordinates within the vehicle independent of which face is presented to a user;
 the rotatable body is positioned within a housing that is coupled to the vehicle;
 the housing is a floor console of the vehicle;
 the housing includes an actuatable closeout panel;
 the closeout panel pivots about a fixed axis when the rotatable body is rotated about the dowel; and
 a stowed position of the one or more storage features results in the one or more storage features occupying the same coordinates as the dowel in one of a horizontal plane and a vertical plane while the one or more storage features occupy different coordinates from the dowel in the other of the horizontal plane and the vertical plane.

According to a third aspect of the present disclosure, a storage solution for a vehicle includes a rotatable body that has a plurality of faces. A dowel defines a rotation axis and is coupled to opposing faces of the rotatable body. One or more storage features are radially deployable from each face of the rotatable body that is free of engagement with the dowel.

Embodiments of the third aspect of the present disclosure can include any one or a combination of the following features:
 the rotatable body occupies the same horizontal and vertical coordinates within the vehicle independent of which face is presented to a user;
 the rotatable body is positioned within a housing that is coupled to the vehicle;
 the housing is a floor console of the vehicle;
 the housing includes an actuatable closeout panel; and
 a stowed position of the one or more storage features results in the one or more storage features occupying the same coordinates as the dowel in one of a horizontal plane and a vertical plane while the one or more storage features occupy different coordinates from the dowel in the other of the horizontal plane and the vertical plane.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
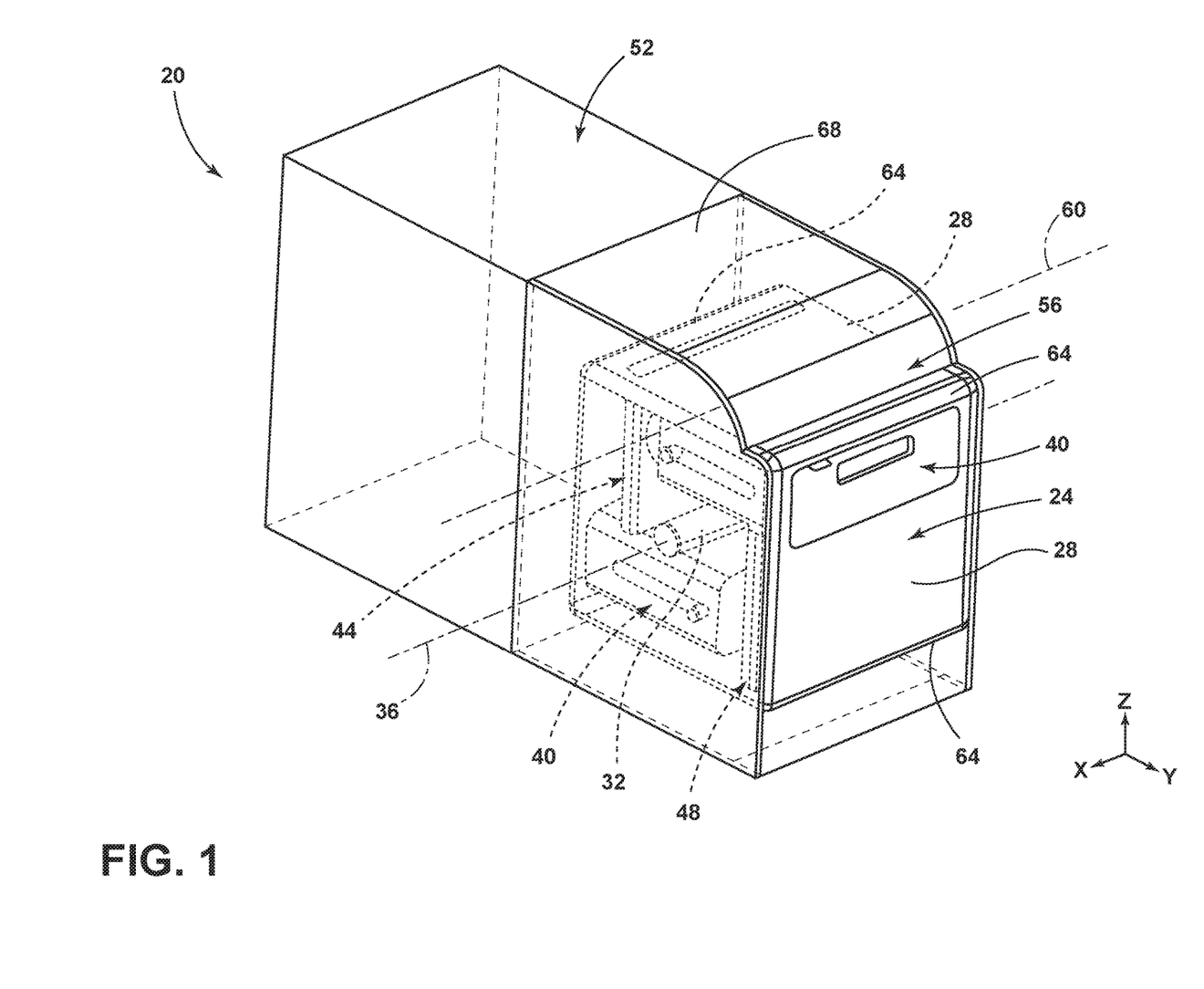
FIG. 1 is a side perspective view of storage solution for a vehicle, illustrating a rotatable body, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a storage solution. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, a storage solution 20 for a vehicle includes a rotatable body 24. The rotatable body 24 may have a plurality of faces 28. A dowel 32 may be coupled to opposing faces 28 of the rotatable body 24 and may define a rotation axis 36 of the rotatable body 24. One or more storage features may be provided in the rotatable body 24 that are deployable from each of the faces 28 of the rotatable body 24 that is free of engagement with the dowel 32. The storage features may include, but are not limited to, one or more drawers 40, one or more beverage holders 44, and/or a connectivity table 48. The one or more storage features may be radially deployable from the rotatable body 24 between a stowed position and an extended position. The radial deployment of the one or more storage features from the rotatable body 24 is referenced relative to the dowel 32 and/or the face 28 that is associated with the storage feature.

Referring again to FIG. 1, the rotatable body 24 may be positioned within a housing 52 that is coupled to the vehicle. The rotatable body 24 may occupy the same horizontal (e.g., X-Y plane) and vertical coordinates (e.g., Y-Z plane and/or X-Z plane) within a cabin of the vehicle independent of which of the faces 28 is presented to a user. For example, the housing 52 may be a floor console or center console of the vehicle. Accordingly, the housing 52 may be positioned between a pair of front row seating assemblies with the rotatable body 24 accessible by at least one of a driver of the vehicle, and the front row passenger, a rearward row passenger, and/or combinations thereof. In some examples, the housing 52 may be an instrument panel or dashboard assembly of the vehicle such that the rotatable body 24 is generally position vehicle forward of the front row seating assemblies. Regardless of the position of the housing 52 within the cabin of the vehicle, the housing 52 may include a closeout panel 56 that is actuatable. The closeout panel 56 may pivot about a fixed axis 60 when the rotatable body 24 is rotated about the dowel 32. For example, as the user rotates the rotatable body 24 to access an alternate one of the faces 28, an edge 64 between the faces 28 may contact an inner side of the closeout panel 56 and induce the rotational motion of the closeout panel 56 about the fixed axis 60. The edge 64 may be provided as a rounded corner rather than a sharp corner to prevent binding the rotatable body 24 as the rotatable body 24 is rotated about the dowel 32. Once the edge 64 has passed the closeout panel 56, the closeout panel 56 may positively engage a top-facing one of the faces 28 to prevent items, such as debris, from entering the housing 52 and causing binding or unnecessary wear and tear to the housing 52 and/or rotatable body 24. The closeout panel 56 may be biased toward engagement with one of the faces 28 that is proximate thereto by a biasing member, such as a spring such that the closeout panel 56 may prevent unintentional rotation of the rotatable body 24. The closeout panel 56 may be generally arcuate in shape to close a gap created by a difference in height between a top surface 68 of the housing 52 and one of the faces 28 that is proximate to the closeout panel 56. Accordingly, the shape and structure of the closeout panel 56 may at least partially prevent rotation of the rotatable body 24 in a generally counterclockwise direction as oriented in FIG. 1. The rotatable body 24 may be capable of unidirectional rotation to prevent damage to the components of the storage solution 20, such as the rotatable body 24, the housing 52, and/or the closeout panel 56.

Figures 2A, 2B:
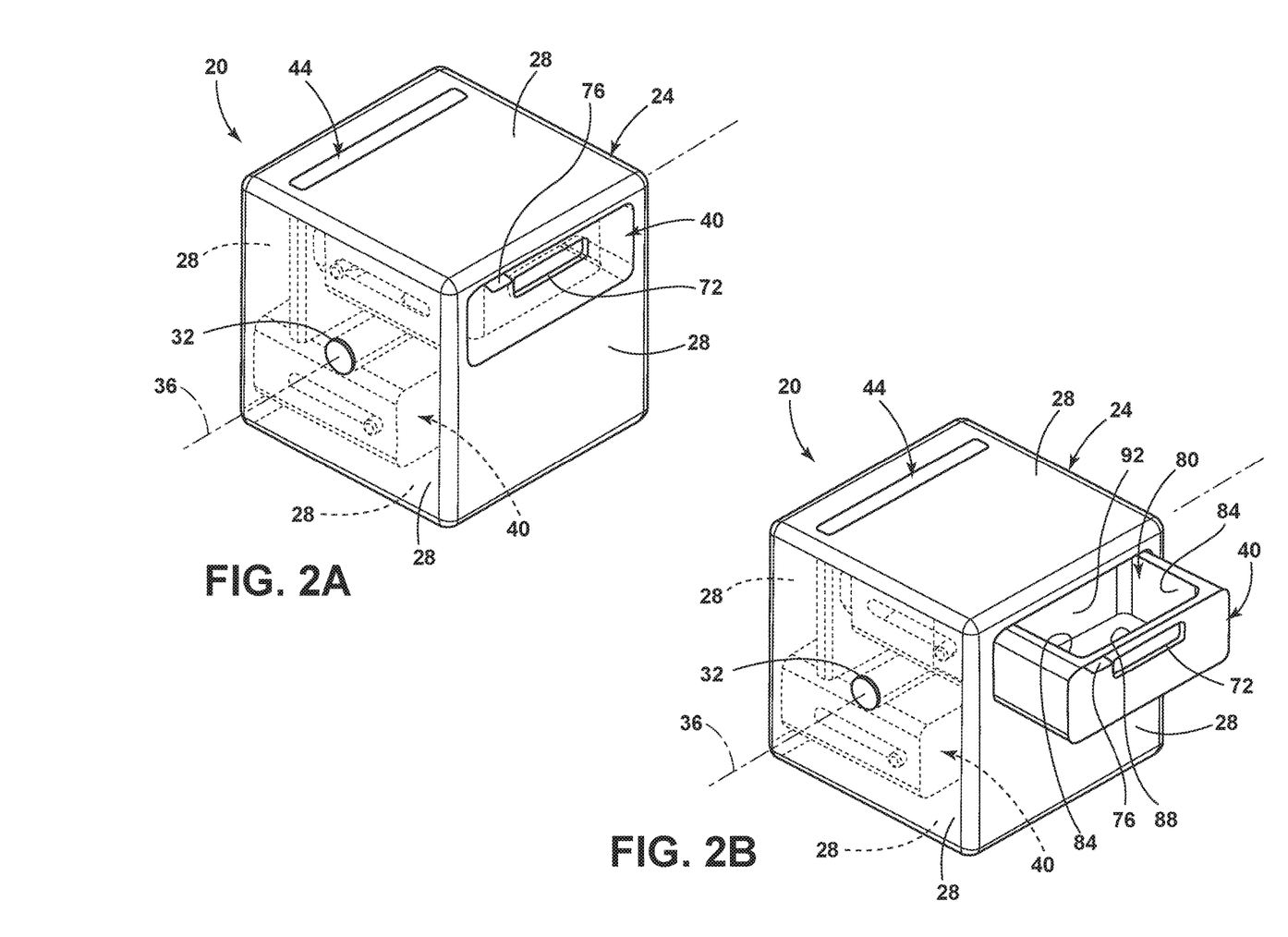
FIG. 2A is a top perspective view of the rotatable body, illustrating a drawer in a closed or stowed position.
FIG. 2B is a top perspective view of the rotatable body, illustrating the drawer in an extended or use position.

Referring now to FIGS. 2A and 2B, the one or more drawers 40 may be provided with a handle 72. The handle 72 may be integrally formed in a front surface of the drawer such that the handle 72 is defined by a recessed portion in the front surface. In some examples, the drawer 40 may be provided with a lock feature 76 that can be actuated between a locked position and an unlocked position. The lock feature 76 may be utilized, in one example, to secure valuable items within the cabin of the vehicle. The lock feature 76 may prevent unintentional opening of the drawer 40 due to abrupt vehicle maneuvers, incidental contact with cargo items, and/or passengers. Additionally or alternatively, the drawer 40 may be retained by a detent feature that requires a predetermined force to overcome such that unintentional opening of the drawer 40 is prevented. In some examples, the drawer 40 may be retained in the stowed position by a push-push mechanism. Upon opening the drawer 40, a cavity 80 becomes accessible to the user. The cavity 80 is defined by a plurality of sidewalls 84, a front wall 88, and a rear wall 92.

Figure 3A:
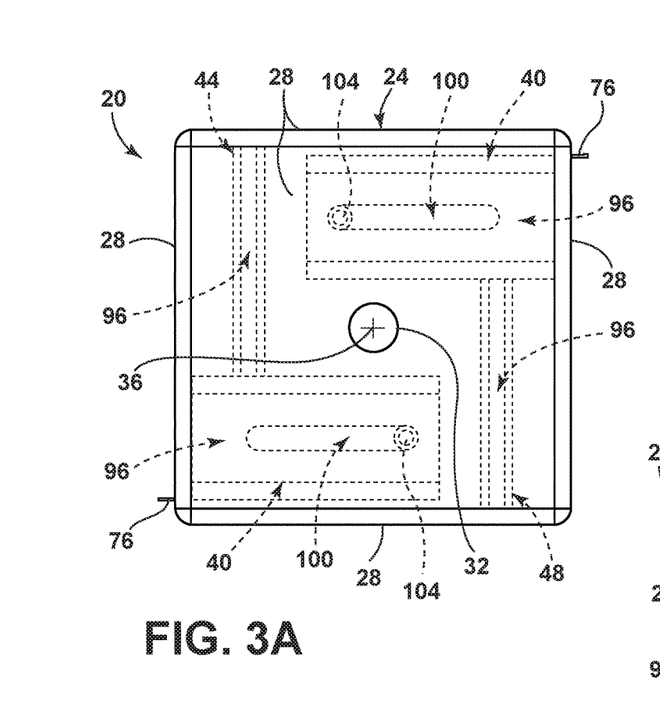
FIG. 3A is a side view of the rotatable body, illustrating various storage features in stowed positions.
Figure 3B:
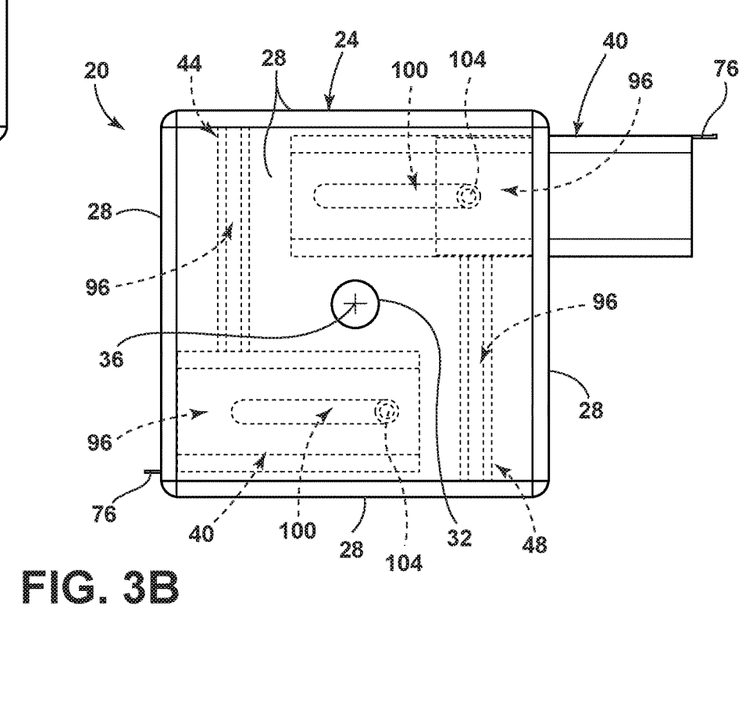
FIG. 3B is a side view of the rotatable body, illustrating one of the storage features in the extended position.

Referring to FIGS. 3A and 3B, the stowed position of the one or more storage features, such as the one or more drawers 40, the beverage holder 44, and/or the connectivity table 48 may occupy the same coordinates as the dowel 32 in at least one plane or direction. For example, the stowed position of the one or more storage features may result in the one or more storage features occupying the same coordinates as the dowel 32 in one of a horizontal plane (e.g., X-Y plane) and a vertical plane (e.g., X-Z plane and/or Y-Z plane) while the one or more storage features occupy different coordinates in the other of the horizontal plane and the vertical plane. Said another way, the size of the one or more storage features is not limited by the dowel 32. The one or more storage features are each slidably coupled to the rotatable body 24 by guide tracks 96. The guide tracks 96 guide the actuation of the one or more storage features between the stowed position and an extended or use position. In some examples, such as the drawers 40, the guide tracks 96 may include guide slots 100 that receive guide pins 104 on the storage feature (e.g., drawers 40). The guide slots 100 may define an innermost extreme (FIG. 3A) and an outermost extreme (FIG. 3B) that are used as stops for the actuation of the storage feature. The guide tracks 96 may include a damper that can be utilized to secure the storage feature in the stowed position, the extended position, and/or an intermediate position. The damper may maintain the storage feature in a substantially constant position when the storage feature is deployed, and in some instances, when the storage feature is deployed rapidly. The damper may be mounted on the guide track 96 or the storage feature and can be arranged to engage the other of the guide track 96 or the storage feature. According to some examples, the damper can be a fluid damper. The damper can include a gear that can be connected to a disk contained in a housing containing a viscous fluid. Rotation of the gear can rotate the disk in the viscous fluid so that the damper can slow the movement of the storage feature to provide a smooth and/or steady opening and closing motion of the storage feature. Those skilled in the art will appreciate that the damper can be other damper arrangements including pneumatic, hydraulic, and mechanical dampers instead of a viscous damper described above. In operation, a user can grasp the handle 72 to move the storage feature (e.g., drawer 40) between open and closed positions. The damper can allow the storage feature to move smoothly between positions without opening or closing hard. The storage feature(s) described herein can be provided with a damper to improve a user's experience with the storage feature and also to help prevent accidental opening of the storage feature within the housing 52 or into the cabin of the vehicle.

Referring again to FIGS. 3A and 3B, the deployment path of each of the storage features may be perpendicular to the deployment path of each of the storage features that are immediately adjacent thereto. Additionally, the deployment path of opposing storage features (e.g., the drawers 40 or the beverage holder 44 and the connectivity table 48) may be parallel to one another. For example, if the depicted coordinate space were to rotate with the rotatable body 24, the deployment path or deployment axis of one of the drawers 40 may be in the positive Y-direction while the deployment axis of the other of the drawers 40 may be in the negative Y-direction. Similarly, the deployment axis of the beverage holder 44 may be in the positive Z-direction and the deployment axis of the connectivity table 48 may be in the negative Z-direction.

Figure 4:
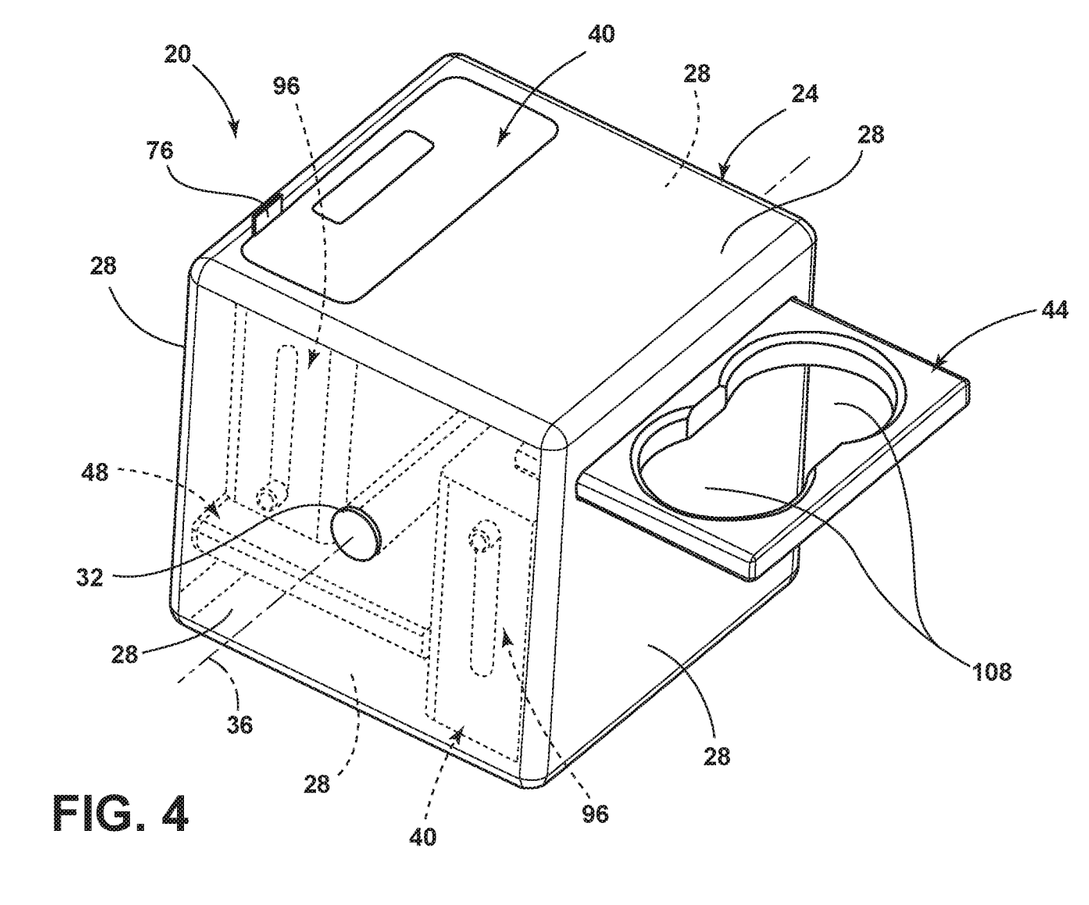
FIG. 4 is a top perspective view of the rotatable body, illustrating a beverage holder in the extended or use position.
Figure 5:
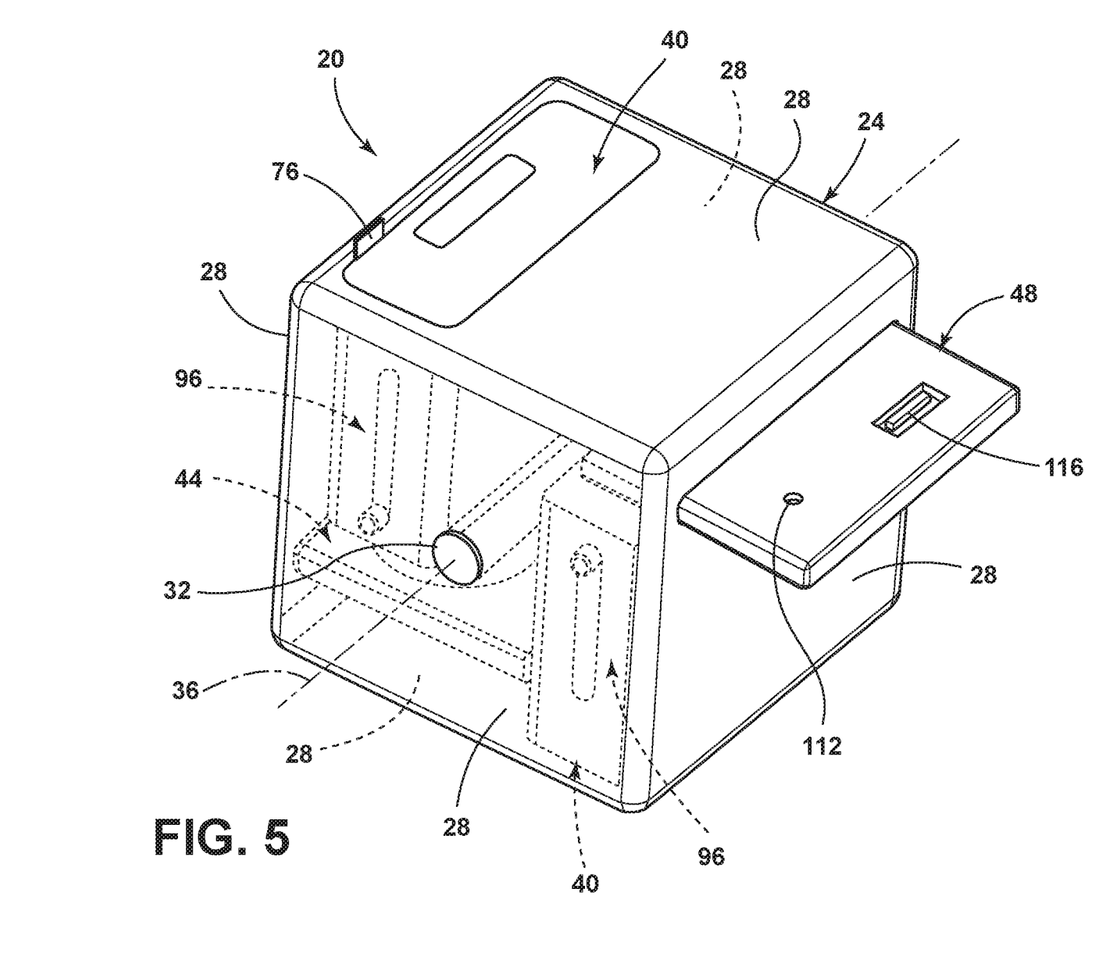
FIG. 5 is a top perspective view of the rotatable body, illustrating a connectivity table in the extended or use position.

Referring now to FIGS. 4 and 5, in some examples of storage features, the guide tracks 96 may be omitted and an opening in the face 28 of the rotatable body 24 may provide the guidance and support to the storage feature (e.g., the beverage holder 44 and/or the connectivity table 48) as the storage feature is actuated between the stowed position and the extended or use position. The rotatable body 24 may be generally cube-shaped. It is contemplated that the rotatable body 24 may take the shape of many different polygons without departing from the concepts disclosed herein. For example, the rotatable body 24 may be provided with a greater number of sides than those depicted herein in an effort to provide the user with a greater variety of storage features or to provide more than one of the faces 28 as accessible at a time. In some examples, the rotatable body 24 may be provided with a fewer number of sides than those depicted here. The beverage holder 44 may be configured to hold a plurality of beverage containers within beverage apertures 108. The beverage apertures 108 may be formed in the beverage holder 44 as a generally continuous aperture such that the beverage apertures 108 generally resemble a number eight configuration. Alternatively, the beverage apertures 108 may be separated into discrete apertures that are separated by a bridge structure.

Referring again to FIGS. 4 and 5, the connectivity table 48 may be equipped with one or more power outlets 112 (e.g., 12V outlet, 110V outlet, etc.) and/or one or more data transfer connectors or plugs 116 (e.g., USB, near-field communication, etc.). It is contemplated that the power outlets may be incorporated with the data transfer plugs, such as a USB port. The connectivity table 48 may also be utilized as a working surface. The working surface may be utilized for a number of tasks, including, but not limited to, writing or placing a laptop thereupon. Power and/or data cables may be provided to the dowel 32 to prevent torsional stress to the power and/or data cables as the rotatable body 24 is rotated. The power and/or data cables may couple to the power outlet 112 and/or the data transfer plug 116. For example, the dowel 32 may be provided with power and/or data receptacles that receive male ends of power and/or data cables, respectively, that are coupled to the power outlet 112 and the data transfer plug 116 and extend into the rotatable body 24. Accordingly, during assembly the connectivity table 48 may be coupled to the power and/or data receptacles. Alternatively, the power and/or data cables may pass through the dowel 32 (e.g., along the rotation axis 36) and extend through an aperture in the dowel 32 to engage with the connectivity table 48. In some examples, the power and/or data cables running between the dowel 32 and the connectivity table 48 may be omitted and power and/or communication may be established between the power outlet 112 and the data transfer plug 116 by way of inductive coupling or resonant frequency power transfer and near-field communication, respectively.

The rotatable nature of the rotatable body 24 presents a unique and efficient user experience to the vehicle. Alternative approaches are contemplated that utilize open storage features on the faces 28 of the rotatable body 24, such as open storage compartments and/or cup holders. However, open storage features present potential hazards to the functionality of the storage solution 20. For example, in the event of an impact event, unintentional actuation of the rotatable body 24, or a user leaving an item in the open storage feature while actuating the rotatable body 24, then the item stored within the storage feature may be lost within the housing and/or cause the rotatable body 24 to bind and become inoperable. Accordingly, the storage solution 20 and the rotatable body 24 of the present disclosure are superior executions of the vehicle multi-function storage solution. Additionally, the multiple deployment axes or deployment paths of the storage features a unique design that prevents items stored within the individual storage features from interacting with one another or becoming dislodged to rattle within the rotatable body 24.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A storage solution for a vehicle, comprising:
   a housing that comprises an actuatable closeout panel;
   a rotatable body positioned within the housing, the rotatable body having a plurality of faces;
   a dowel defining a rotation axis and coupled to opposing faces of the rotatable body, wherein the actuatable closeout panel of the housing pivots about a fixed axis when the rotatable body is rotated about the dowel; and
   one or more storage features that are deployable from each face of the rotatable body that is free of direct engagement with the dowel.

2. The storage solution for a vehicle of claim 1, wherein the rotatable body occupies the same horizontal and vertical coordinates within the vehicle independent of which face is presented to a user.

3. The storage solution for a vehicle of claim 1, wherein the housing is a floor console of the vehicle.

4. The storage solution for a vehicle of claim 1, wherein a stowed position of the one or more storage features results in the one or more storage features occupying the same coordinates as the dowel in one of a horizontal plane and a vertical plane while the one or more storage features occupy different coordinates from the dowel in the other of the horizontal plane and the vertical plane.

5. A storage solution for a vehicle, comprising:
   a housing comprising an actuatable closeout panel;
   a rotatable body that is generally cube-shaped and has a plurality of faces, the rotatable body being positioned within the housing;
   a dowel defining a rotation axis and coupled to opposing faces of the rotatable body, wherein the actuatable closeout panel pivots about a fixed axis when the rotatable body is rotated about the dowel; and
   one or more storage features that are deployable from each face of the rotatable body that is free of direct engagement with the dowel.

6. The storage solution for a vehicle of claim 5, wherein the rotatable body occupies the same horizontal and vertical coordinates within the vehicle independent of which face is presented to a user.

7. The storage solution for a vehicle of claim 5, wherein the housing is a floor console of the vehicle.

8. The storage solution for a vehicle of claim 5, wherein a stowed position of the one or more storage features results in the one or more storage features occupying the same coordinates as the dowel in one of a horizontal plane and a vertical plane while the one or more storage features occupy different coordinates from the dowel in the other of the horizontal plane and the vertical plane.

9. A storage solution for a vehicle, comprising:
   a housing comprising an actuatable closeout panel;
   a rotatable body having a plurality of faces, the rotatable body being positioned within the housing;
   a dowel defining a rotation axis and coupled to opposing faces of the rotatable body, wherein the actuatable closeout panel pivots about a fixed axis when the rotatable body is rotated about the dowel; and
   one or more storage features that are radially deployable from each face of the rotatable body that is free of direct engagement with the dowel.

10. The storage solution for a vehicle of claim 9, wherein the rotatable body occupies the same horizontal and vertical coordinates within the vehicle independent of which face is presented to a user.

11. The storage solution for a vehicle of claim 9, wherein the housing is a floor console of the vehicle.

12. The storage solution for a vehicle of claim 9, wherein a stowed position of the one or more storage features results in the one or more storage features occupying the same coordinates as the dowel in one of a horizontal plane and a vertical plane while the one or more storage features occupy different coordinates from the dowel in the other of the horizontal plane and the vertical plane.

* * * * *